Sept. 11, 1956      F. L. DAVIS      2,762,482
DRIVES FOR VEHICLE ENGINE COOLING FANS
Filed April 14, 1954
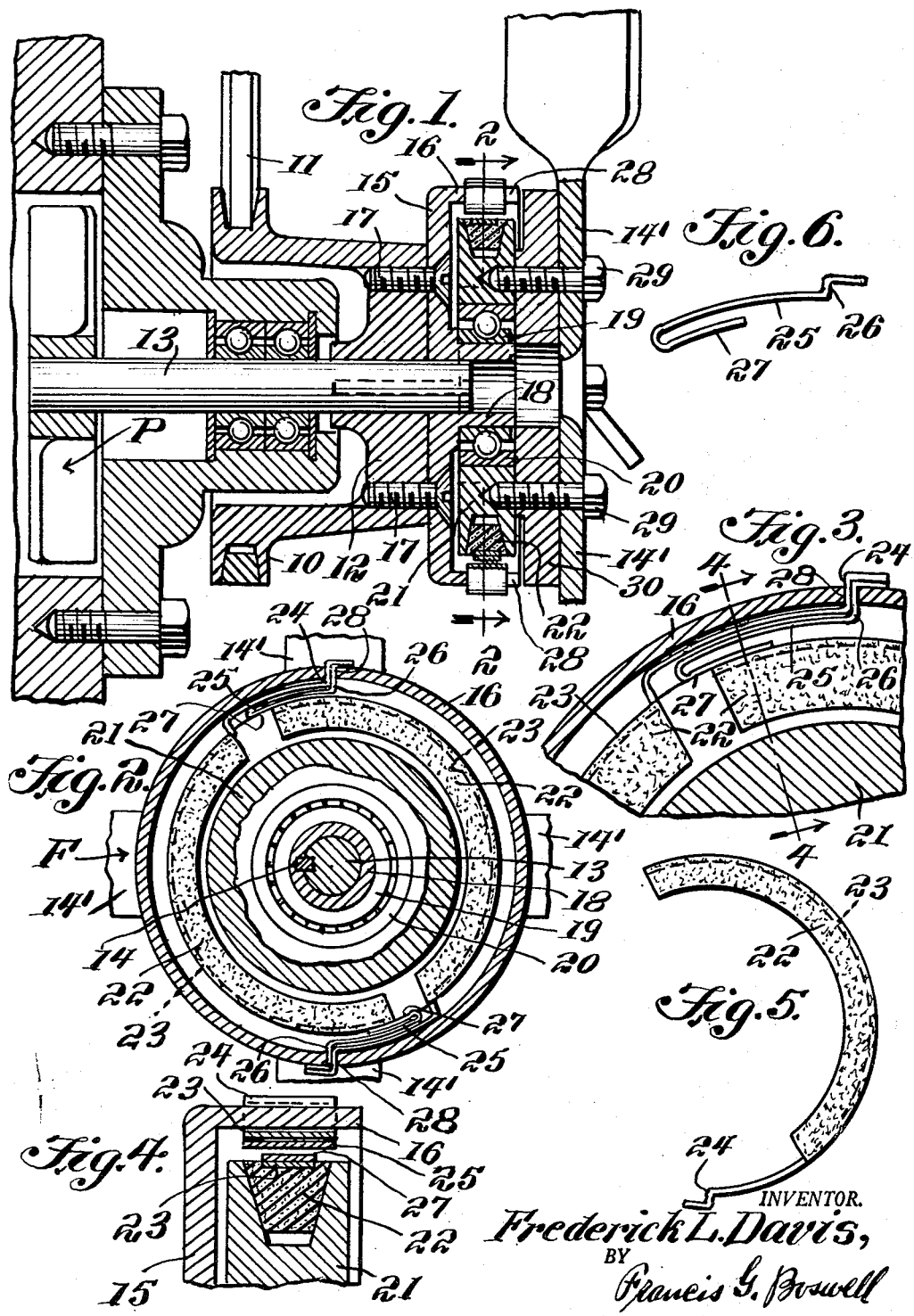
INVENTOR.
Frederick L. Davis,
BY
Francis G. Boswell
ATTORNEY

United States Patent Office 2,762,482
Patented Sept. 11, 1956

2,762,482
DRIVES FOR VEHICLE ENGINE COOLING FANS

Frederick L. Davis, Fayetteville, N. C.

Application April 14, 1954, Serial No. 423,037

3 Claims. (Cl. 192—104)

Since auto vehicle engines require artificial cooling of the circulatory system only at vehicle speeds of thirty-five miles per hour or less and since the natural cooling of the system is sufficient at speeds above thirty-five miles per hour and since the power absorbed by the fan at such high speeds will reach twenty horsepower or more, the object of the invention is to provide a mechanism or device for inclusion between the driving means and the fan so that the latter is mechanically operated only at the aforesaid critical speed and less and released to rotate freely at vehicle speeds above such critical speed. Further, it is the object of the invention to provide a device for the purpose indicated which may be incorporated in the conventional fan drives without modification of the latter; and further, to provide a device susceptible of the indicated functions but which is still simple in form and is composed of few parts making for its cheap manufacture and sale.

With this object in view, the invention consists in a construction and combination of parts of which a preferred embodiment is illustrated in the accompanying drawings, wherein:

Figure 1 is a vertical sectional view through the circulatory pump and fan of a motor vehicle showing the invention applied in operative position therein;

Figure 2 is a sectional view on the plane indicated by the line 2—2 of Figure 1;

Figure 3 is a detail section, enlarged, of that portion of the invention where the segment springs are anchored;

Figure 4 is a sectional view on the plane indicated by the line 4—4 of Figure 3;

Figure 5 is an elevational view of one of the clutch segments; and

Figure 6 is an elevational view of one of the leaf springs constituting the terminal of the segment opposite to that one shown in Figure 5.

Generally, in a motor vehicle construction, the circulatory pump P and fan are axially alined and driven by a common sheave pulley 10 through the medium of a belt 11 operatively connected with the vehicle motor.

The hub 12 of the sheave is mounted on the impeller shaft 13 of the pump to which it is keyed as indicated at 14 and, if the invention were not employed, the arms 14 of the fan would be bolted directly to the hub so that in the rotation of the sheave, the pump impeller and the fan would be positively connected and would rotate in unison.

The device of the invention consists of a clutch interposed between the fan and the hub 12. It consists of a driving member 15 in the form of a flat plate with a peripheral laterally projecting flange 16. This plate is secured to the hub by means of flat head screws 17 entering the holes in which the fan-carrying cap screws were previously received. The plate 15 is formed with a hub 18 on which the inner ring 19 of a ball bearing is received, the ring having a force fit on the hub. The outer ring 20 of the ball bearing has a similar fit in the center bore of the driven member 21 which is peripherally grooved to receive the arcuate clutch elements 22 which are in the form of circular segments cross-sectionally conforming to the groove in the driven member.

The segments 22 are bound on their outer peripheries with steel leaf springs 23 of which one terminal extends beyond the extremity of the segment and is bent into Z-shaped form, as indicated at 24. The spring strips 23, at the opposite extremities, have connected with them the leaf spring members 25 formed with Z-shaped terminals 26 and with return bends 27 which are secured to the spring strips.

The driving member, on its flange 16 is formed at diametrically opposite sides with axial slots 28 opening at the outer edge of the flange, and in these slots are received the Z-shaped ends 24 and 26 of the clutch segments, the segments being disposed so that in each slot there is the terminal 24 of one segment, together with the terminal 26 of the other segment. The fan is secured to the driven member by means of cap screws 29 which previously secured it to the hub 12. Therefore, a filler ring 30 is interposed between the fan and the driven member not only to make use of the previously employed cap screws but to adequately space the fan from the driving member.

From the aforesaid description and drawings it is apparent that at low speeds the spring arms connected with the clutch segments keep the latter in engagement with the groove in the driven member so that the driving and driven members rotate in unison to drive the fan for artificial cooling. When the vehicle speed exceeds thirty-five miles per hour, making artificial cooling unnecessary, the centrifugal force resulting from the increased engine speed causes the segments to be thrown out toward the inner periphery of the flange 16 of the driving member, and thus the theretofore driving connection between the driving and driven members is broken and the fan is free to rotate independently of the hub 12. Therefore, the additional horsepower to keep the fan moving at high speeds is saved, since the natural cooling by air passing through the grill is sufficient to prevent too high temperature in the circulatory system.

The invention having been described, what is claimed as new and useful is:

1. A clutch of the kind indicated comprising a driving member formed with a lateral peripheral flange, a driven member rotatingly mounted on the driving member within the confines of said flange, and arcuate segments peripherally engaged with the driven member and provided with spring members at their opposite ends which connect them with the flange of the driving member to pull the segments in the direction of rotation of the driving member and also to impel them into contact with the driven member, said members yielding under centrifugal force to release the segments from the driven member at and above a critical speed of the latter.

2. A clutch of the kind indicated comprising a driving member formed with a lateral peripheral flange, a driven member rotatingly mounted on the driving member within the confines of said flange, and arcuate segments peripherally engaged with the driven member, steel leaf springs binding the segments on their outer peripheries and extended beyond the extremities of the segments and having the terminals of such extensions bent into Z-shaped form, other leaf spring members formed with Z-shaped terminals and with return bends and secured to the first said spring members at the ends remote from the said extensions, the segments being assembled with the bended spring member of one in contact with the spring extension of the other and the Z-shaped terminals seated in pairs in slots in the driving member flange, whereby the spring members can keep the segments in contact with the driven member and pull it into unison with the driving member below a critical speed and yielding to centrifugal force to release the segments from the driven member at and above such critical speed.

3. A clutch of the kind indicated comprising a driving member in the form of a plate, a driving pulley attached to the plate, the driving member being formed with a lateral peripheral flange having slots opening on its outer edge, a driven member having a rotatable mounting on the driving member within the confines of said flange, and arcuate segments peripherally engaged with the driven member and provided with flat spring members having Z-shaped terminals seated in the slots in the flange of the driving member, the spring members impelling the segments into contact with the driven member and pulling it into unison with the driving member below a critical speed and yielding to centrifugal force to release the segments from the driven member at and above such critical speed.

References Cited in the file of this patent

UNITED STATES PATENTS

| | | |
|---|---|---|
| 1,782,513 | Roos | Nov. 25, 1930 |
| 1,927,509 | Waterhouse | Sept. 19, 1933 |
| 2,216,703 | Ericson | Oct. 1, 1940 |
| 2,452,650 | Greenlee | Nov. 2, 1948 |
| 2,506,520 | Spase | May 2, 1950 |

FOREIGN PATENTS

| | | |
|---|---|---|
| 630,753 | Germany | June 11, 1936 |